Nov. 16, 1926. 1,607,069
W. G. GERNANDT
MEANS FOR FEEDING FUEL TO HIGH COMPRESSION AND
GENERAL COMBUSTION ENGINES
Original Filed August 22, 1924
Fig. 3
Fig. 1
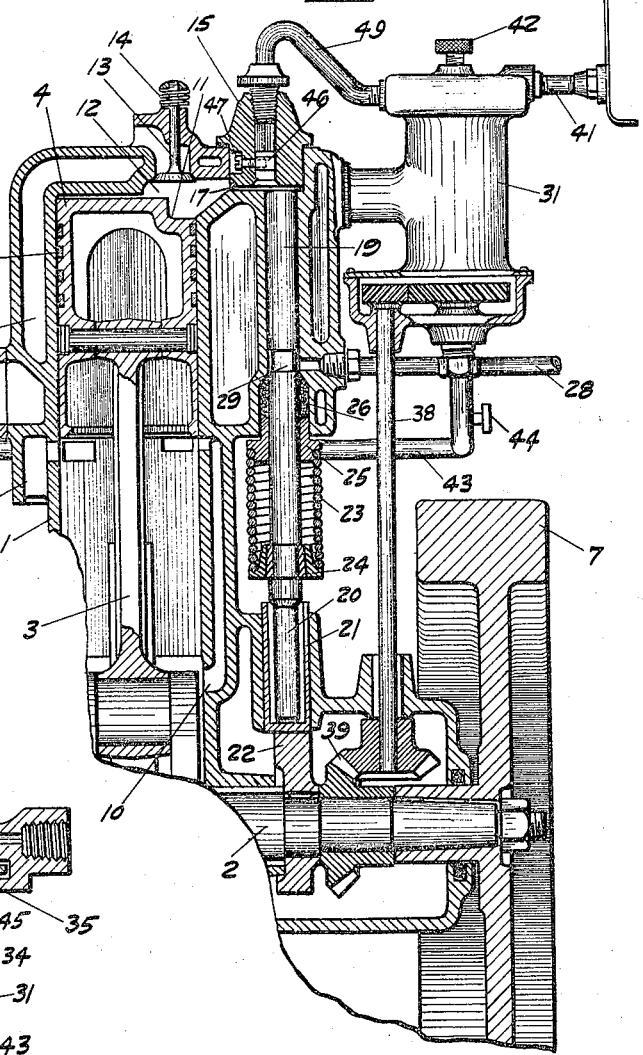
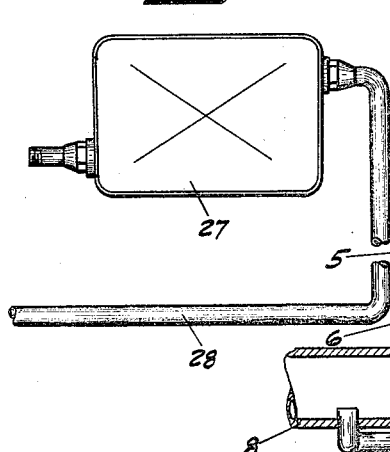
Fig. 2
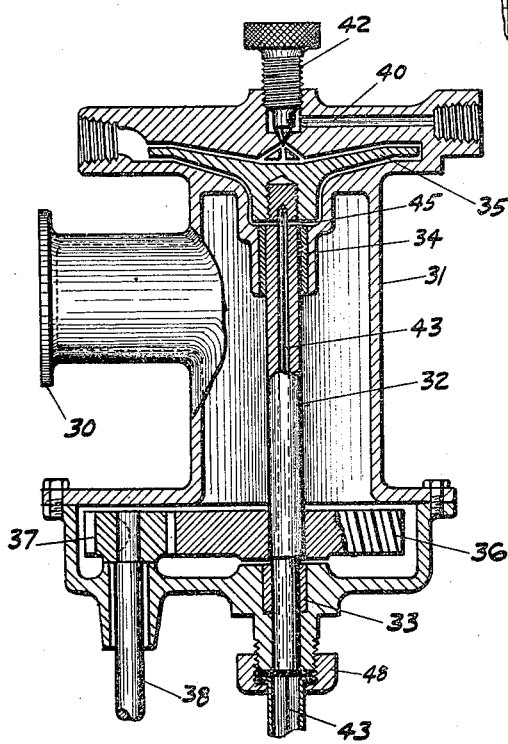
Fig. 4
INVENTOR
WALDO G. GERNANDT
BY
A. D. T. Libby
ATTORNEY Patented Nov. 16, 1926.

1,607,069

UNITED STATES PATENT OFFICE.

WALDO G GERNANDT, OF BERKELEY, CALIFORNIA, ASSIGNOR TO GERNANDT MOTOR CORPORATION, OF CHICAGO, ILLINOIS.

MEANS FOR FEEDING FUEL TO HIGH-COMPRESSION AND GENERAL COMBUSTION ENGINES.

Application filed August 22, 1924, Serial No. 733,490. Renewed August 7, 1926.

This invention relates to means for feeding fuel to a high compression combustion engine, especially, of the general type described in my Patent #1,359,498 issued November 23, 1920, wherein fluid products of combustion are trapped and then compressed in a compression chamber for the purpose of forcing fuel from a fuel depository into the engine cylinder at the proper time to get the maximum effect on the engine piston. Engines of this class can be operated on various grades of fuel, such as kerosene, gasolene, and distillate fuel oil, etc., it being less expensive to operate the engine on the lower grades of fuel, but where low grade fuels are used difficulty is encountered in feeding this to the engine cylinder especially where variable speed is desired and widely varying temperature conditions exist.

It is one of the objects of my present invention to provide a means of breaking up the fuel and feeding this into the engine cylinder in such a manner to get smooth action and maximum results.

Another object of my invention is to provide means for preventing the burning of the fuel while in a gaseous state previous to its injection into the cylinder.

Another object of my invention is to provide better economy of operation due to the gaseous state of the fuel.

Other objects will be apparent after a study of the specification, and drawings annexed hereto in which it is to be understood that the drawings are merely illustrative and in no sense are to be taken as working drawings.

Figure 1, is a part sectional view through an engine showing fuel feeding means attached thereto.

Figure 2, is a sectional view on a larger scale of part of the fuel feeding means.

Figure 3, illustrates the fuel tank partially shown in Fig. 1, while,

Figure 4, is a detail of the spray slot plate used in connection with the fuel plug.

Referring now to details wherein like numbers refer to corresponding parts of various views, 1, is an engine cylinder having a piston 4 therein; the latter being connected by a rod 3 to a crankshaft 2 on the end of which is fly wheel 7. The piston 4, has the usual piston rings 5. The cylinder 1, also has a water-jacket 6. The engine illustrated is of the two cycle type having an exhaust 8, and an air intake 9, and bypass 10 for passing the air which is compressed in the crank case through to the cylinder when the piston is at substantially the lowest position of the stroke. Piston 4 has a portion 11 removed to serve to deflect air away from the exhaust port as it comes from bypass 10. Pocket 12 formed in the upper part of the cylinder when the piston is in its position of highest compression, a valve 13 held in position by a spring 14 is used in the head of the cylinder for the purpose of relieving compression at the time of starting the engine. Attached to the end of the cylinder in any satisfactory manner, as by bolts, not shown, is a plug 15. The inner end of the plug 15 rests on the spray slot plate 18 which is so constructed that a portion 16 acts as a fuel depository or passage having an opening 17 leading into the pocket 12; this opening 17 thus forms a restricted passageway and assists in trapping fluid products of combustion in the fuel depository and compression chamber in which the plunger 19 operates. The lower end 20 of the plunger 19 is actuated in any satisfactory manner from the crankshaft 2, the means illustrated consisting of a hardened steel cup 21 engaging a cam 22 fastened to the crankshaft 2. The plunger 19 is normally held against the seat in the cup 21 by a spring 23 positioned between the collar 24 and bushing 25 which bushing also serves to hold the packing 26 in place around the plunger 19. A fuel tank 27 is provided in which pressure is set up through a pipe 28 by virtue of the fact that there is actually a pressure leakage by the plunger 19 due to the necessary mechanical clearance around the plunger to the recess 29 which thus acts as a medium through which leakage pressure is applied to the fuel in the tank 27.

Preferably supported to the side of the engine as by means of a flange 30, is a mixing device 31. This device comprises a casing within which a shaft 32 is positioned in any satisfactory manner as by means of bushings 33 and 34. Attached to the upper end of the shaft 32 is a disc 35, preferably somewhat dished. At the lower end of the shaft 32 is attached gear-wheel 36 which is in connection with gear 37 being in turn operated by a shaft 38 connected by a pair of gears 39 to crankshaft 2. While the gears shown, merely illustrate the idea, their ratio may be such so as to give any desired speed of rotation to the disc 35 which receives the fuel through the passage 40 connected by the pipe 41 to the tank 27, the amount of fuel being controlled by a needle valve 42. The shaft 32 is hollow as indicated at 43 and to the hollow portion of the shaft is associated by means of a coupling member 48, a pipe 43 leading to the exhaust pipe 8. A valve 44 is provided to control the amount of exhaust gas or fluid products of combustion that may be taken through the pipe 43. The fluid products of combustion come through openings 45 and passes around the disc 35 and the rotation of the disc 35 mixes the fuel with these hot inert gases and the fuel is thus broken up and maintained in such state. The chamber 35 is connected by a duct 49 to the plug 15 which has a bore with a check valve 46 opening into the fuel depository and the compression chamber at the proper time. The check valve 46 has the end of a small screw 47 positioned in a groove therein in order to limit the movement of the check valve as well as to prevent the valve from falling out when the plug is removed from the cylinder.

Since the general operation of a two cycle engine is well understood no extended description appears to be necessary except to say that part of the products of combustion in the pocket 12 expand through the opening 17 on return movement of the plunger 19 which by its suction action opens the check valve 46 and draws in a charge of the mixture from the chamber 35. On the compression stroke of the piston 4, the unscavenged gas remaining in the upper part of the cylinder in pocket 12, are forced into the compression chamber and thus added to the mixture already contained therein and this mixture is then forced by the plunger 19 into the cylinder at the proper time to give the maximum result. As the pressure rises in the compression chamber the check valve 46 is closed thereby cutting off the mixing chamber.

It will thus be seen that a regulated quantity of products combustion are used for breaking up the fuel and then a certain quantity of the mixture of products of combustion and fuel are injected into the engine cylinder. It is to be understood that the adjustments of parts is such that the fluid products of combustion used in breaking up the fuel and for injection purposes is not in quantity sufficient to produce a non-combustible or slow burning mixture but rather a dry gas which is injected into the highly compressed air of the main cylinder.

While I have shown how my invention may be applied in practice, I do not wish to be limited to the exact details as it is clear these may be varied over a wide range.

Having thus described my invention what I claim is:

1. In an engine of the class described having a working cylinder and a piston therein, a compression chamber and plunger therein with a passage connecting said cylinder and compression chamber by a restricted opening into said cylinder, means for passing a fuel mixture to said cylinder including a mixing chamber having a fuel inlet thereto, a rotary member in said chamber, means for taking products of combustion into said mixing chamber, a plug in said engine having a bore with a check valve seated in the bore and opening into said passage and a connecting duct from said mixing chamber to the bore in said plug.

2. In an engine of the class described having a working cylinder and a piston therein, a compression chamber and plunger therein with a passage connecting said cylinder and compression chamber by a restricted opening into said cylinder, means for passing a fuel mixture to said cylinder including a mixing chamber having a fuel inlet thereto, a rotary member in said chamber, means for taking products of combustion into said mixing chamber with means for regulating the amount thereof, a part of the engine having a passageway leading to each first passage, a check valve in said passageway opening into said first passage and a connecting duct from said mixing chamber to said passageway in the engine.

3. In an engine of the class described having a working cylinder and a piston therein, a compression chamber and plunger therein with a passage connecting said cylinder and compression chamber by a restricted opening into said cylinder, means for passing a fuel mixture to said cylinder including a mixing chamber having a fuel inlet thereto, a disc positioned in said mixing chamber below said fuel inlet, a hollow shaft attached to said disc, said hollow part of the shaft opening into said mixing chamber near the bottom part of the disc, means for rotating said shaft and disc, a conduit leading from the end of said hollow shaft to a part of the engine where products of combustion can enter said conduit and means for connecting said mixing chamber to said passage and compression chamber for the purposes described.

4. In an engine of the class described having a working cylinder and a piston therein, a compression chamber and plunger therein with a passage connecting said cylinder and compression chamber by a restricted opening into said cylinder, means for passing a fuel mixture to said cylinder including a mixing chamber having a fuel inlet thereto, a "dished" disc positioned in said mixing chamber below said fuel inlet, a hollow shaft attached to said disc, said hollow part of the shaft opening into said mixing chamber near the bottom part of the disc, means for rotating said shaft and disc from a rotary part of said engine, a conduit leading from the end of said hollow shaft to the exhaust of the engine and means for connecting said mixing chamber to said passage and compression chamber for the purposes described.

5. In an engine of the class described having a working cylinder and a piston therein, a compression chamber and plunger therein with a passage connecting said cylinder and compression chamber by a restricted opening into said cylinder, means for atomizing the fuel to be used in the engine comprising; a chamber having a rotary member therein with means for passing fuel into said chamber adjacent said rotary member and further means for passing into said chamber fluid products of combustion preferably in a hot state; and means connecting said chamber to said passage and compression chamber as and for the purpose described.

6. In an engine of the class described having a working cylinder and a piston therein, conjoint means for feeding fuel to said cylnder comprising; firstly, means for trapping products of combustion including, a compression chamber with a plunger therein operated in timed relationship to said piston, and a passage from the compression chamber having a restricted opening into said cylinder; secondly, a mixing chamber having a controlled fuel inlet thereto and means for passing products of combustion preferably in a hot state and in a regulated quantity into said chamber with means within the chamber for mixing said fuel and products of combustion and thirdly, means for passing said fuel mixture to said compression chamber in proper time with respect to said plunger therein for the purpose described.

7. In an engine of the class described having a working cylinder and a piston therein, conjoint means for feeding fuel to said cylinder comprising; firstly, means for trapping products of combustion including, a gas pocket in the upper corner of said cylinder, a compression chamber with a plunger therein operated in timed relationship to said piston, and a passage from the compression chamber having a restricted opening into said gas pocket; secondly, a mixing chamber having a controlled fuel inlet thereto, a rotary member within said mixing chamber to receive the fuel with means for heating said rotary member and the fuel comprising hot products of combustion and thirdly, means for passing said fuel mixture to said compression chamber in proper time with respect to said plunger therein for the purpose described.

8. In an engine of the class described, means for feeding to the engine cylinder a mixture of fuel and products of combustion, comprising; a compression chamber having a plunger therein operated in proper timed relationship to the engine piston; said compression chamber having a restricted communicating passage with the engine cylinder; a mixing chamber with means therein for mixing fuel and a regulated quantity of products of combustion and further means for passing a quantity of the mixture to said compression chamber as and for the purpose described.

9. In an engine of the class described, means for feeding to the engine cylinder a mixture of fuel and products of combustion, comprising; a compression chamber having a plunger therein operated in proper timed relationship to the engine piston with means for trapping fluid products of combustion in said compression chamber consisting of the gas pocket at the upper end of said cylinder with a passage leading from said pocket to said compression chamber, said passage opening into said gas pocket through a restricted opening; a mixing chamber with means therein for mixing fuel and a regulated quantity of products of combustion and further means for passing a quantity of the mixture to said compression chamber as and for the purpose described.

In testimony whereof, I affix my signature.

WALDO G. GERNANDT.